United States Patent

Cronin, II et al.

[11] Patent Number: 5,618,143
[45] Date of Patent: Apr. 8, 1997

[54] SPINDLE NUT AND LOCKING DEVICE

[75] Inventors: Philip J. Cronin, II, Gladstone; Lonnie G. Williams, Jr., Portland; Thomas F. Dunlap, West Linn, all of Oreg.; David C. Wood, Vancouver, Wash.

[73] Assignee: Warn Industries, Inc., Milwaukie, Oreg.

[21] Appl. No.: 333,500

[22] Filed: Nov. 2, 1994

[51] Int. Cl.⁶ .................................................. F16B 39/06
[52] U.S. Cl. ........................ 411/220; 411/948; 411/955; 411/120; 81/461
[58] Field of Search ....................... 411/119–121, 149, 411/150, 955, 956, 153, 152, 220, 948; 81/461, 176.15, 176.2

[56] References Cited

U.S. PATENT DOCUMENTS

| | | | |
|---|---|---|---|
| 613,776 | 11/1898 | Plain | 411/197 |
| 712,905 | 11/1902 | Cannon . | |
| 1,040,215 | 10/1912 | Kriner . | |
| 1,081,631 | 12/1913 | Siever . | |
| 1,140,974 | 5/1915 | Formby . | |
| 1,150,362 | 8/1915 | Hascall . | |
| 1,543,282 | 6/1925 | DeLoe . | |
| 1,611,408 | 12/1926 | Bowers . | |
| 2,909,090 | 10/1959 | Moore | 81/176.15 |
| 3,208,493 | 9/1965 | Holmes . | |
| 3,307,893 | 3/1967 | Williams . | |
| 3,768,345 | 10/1973 | Barnes | 81/176.15 |
| 3,851,690 | 12/1974 | Wing . | |
| 3,942,570 | 3/1976 | Bochman . | |
| 4,210,372 | 7/1980 | McGee | 308/189 |
| 4,812,094 | 3/1989 | Grube | 411/134 |

*Primary Examiner*—Steven N. Meyers
*Assistant Examiner*—Tuyet-Phuong Pham
*Attorney, Agent, or Firm*—Klarquist Sparkman Campbell Leigh & Whinston, LLP

[57] ABSTRACT

A spindle nut and a locking device for securing the nut in a rotative position on a spindle. An anti-rotation spring and a back up plate are mounted on the spindle in a non-rotative manner with the back up plate in abutment with the bearings that rotatively mount the hub to the spindle. The back up plate has multiple grooves aligned with and arranged to receive multiple resilient tabs on the periphery of the anti-rotation spring. The tabs of the anti-rotation spring are formed to project axially from the spring. A flange of the nut has multiple slots around its periphery that are sized to receive a tab of the anti-rotation spring. A tool having extending ears that fit in the slots of the nut is utilized to install the nut on the spindle. The extending ears prevent the tabs of the spring from entering a slot of the nut until the tool is removed. As the nut is rotated by the tool, the nut abuts the anti-rotation spring. The extending ears and the face of the flange in combination force the radial tabs of the spring further into the grooves of the back up plate. When the nut is torqued to the desired level, the tool is removed allowing a tab of the spring to enter a slot of the nut due to its resiliency to lock the nut in a rotative position. Should a tab of the spring not be in alignment with a slot of the nut, the nut need only rotate a few degrees to place one of the slots of the nut in alignment with a tab of the spring.

4 Claims, 2 Drawing Sheets

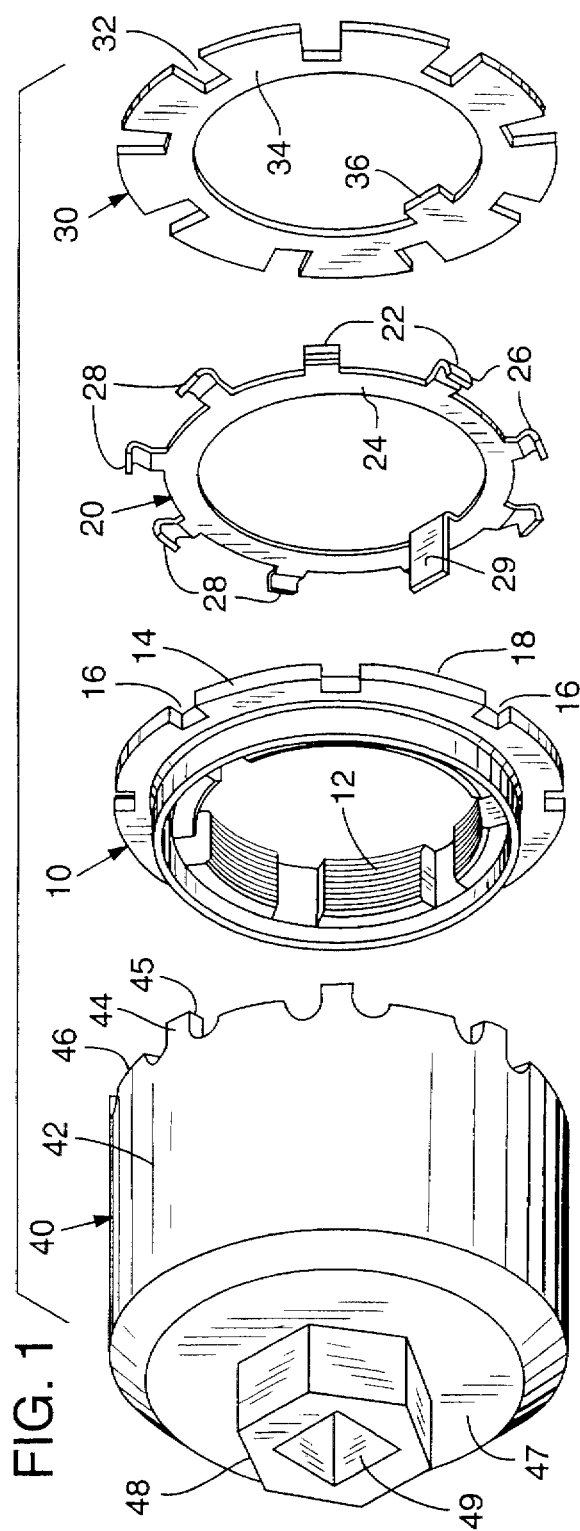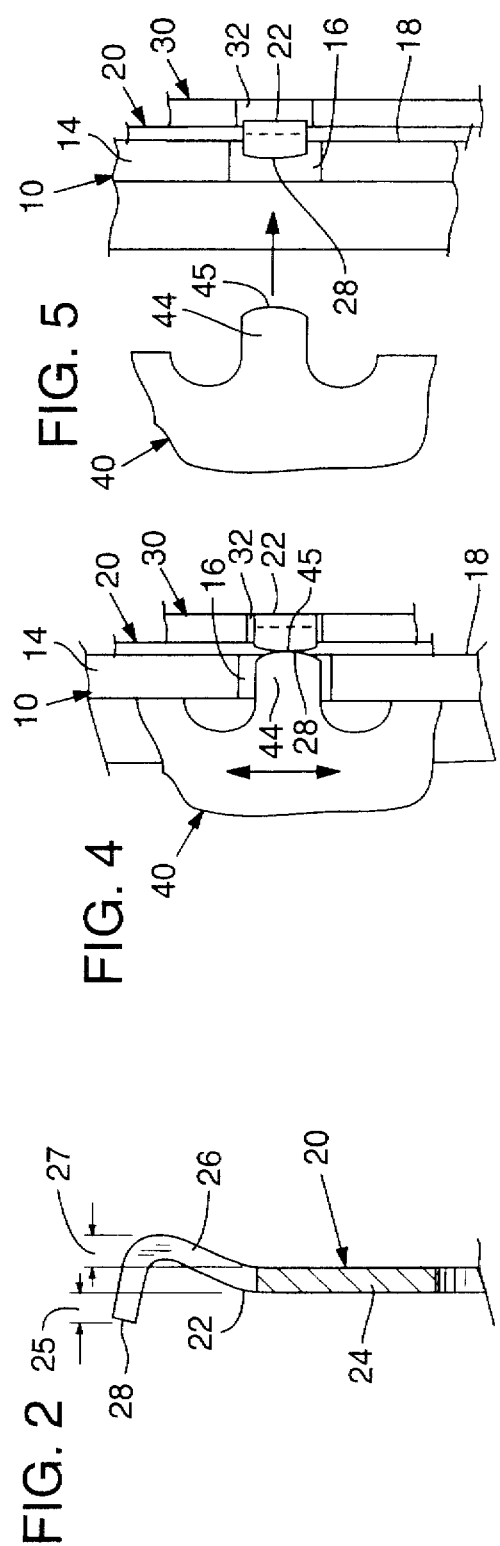

SPINDLE NUT AND LOCKING DEVICE

FIELD OF THE INVENTION

This invention relates to apparatus for locking a threaded member onto another threaded member and more particularly relates to a spindle nut with lock for securing the nut in a rotative position on a motor vehicle wheel spindle.

BACKGROUND OF THE INVENTION

Wheel hubs of a vehicle which are rotatably bearing mounted to a wheel spindle are typically secured by a spindle nut. The nut not only secures the assembly but establishes a pre-load on the bearings. The nut must be secured in a fixed rotative position to maintain the pre-load desired on the bearings and for safety reasons. Should the nut loosen or in the rare instance become tightened further premature bearing failure is likely to occur. Should the nut loosen dramatically, there is the possibility of the wheel coming off the vehicle.

Locking devices are utilized to secure the nut in a fixed rotative position. Typically a locking device engages a keyway (slot) formed in the threaded portion of the spindle so that the locking device is non rotatable relative to the spindle. One such device is a washer that is positioned between the bearings and the nut. After the nut is tightened to establish a desired pre-load on the bearings, the washer is deformed to engage a flat on the nut. This type of lock requires deformation of the washer to establish a lock and when it is desired to disassemble the hub from the spindle, the washer must be deformed again to permit the removal of the nut. The operation of bending the washer is an added operation and often, the washer is not properly deformed to establish a positive engagement with the nut.

Another device has a ring that is attachable to the nut after the nut has been installed. The ring has a protrusion that engages the keyway of the spindle so that it is non-rotatable relative to the spindle. The ring is attached to the nut by multiple fasteners such as screws. The nut must therefore, in almost all installations, be rotatably adjusted so that the fasteners may be inserted through the ring, threadably installed in the nut and tightened. The adjusting of the nut and the manual insertion and tightening of the fasteners requires additional undesired manual operations.

BRIEF SUMMARY OF THE INVENTION

The present invention is a nut and locking device that is particularly suited to vehicle wheel spindle assemblies. The nut and locking device are readily installed or removed by the use of a tool.

A preferred embodiment of the present invention has a nut, a locking spring and a backup plate that secures a wheel hub to a wheel spindle of a vehicle. The backup plate and locking spring have projections that engage a keyway (slot) formed in the threaded portion of the spindle to render them non rotatable relative to the spindle. The nut, locking spring and back up plate are installed on the threaded end of the spindle with the backup plate engaging a race of the bearings. The spring having multiple resiliently axially biased tabs on its periphery is positioned between and in abutment with the nut and the back up plate. The back up plate has peripheral notches that are cooperatively arranged to receive the protruding tabs of the locking spring. The nut has a flange and the flange has slots around its periphery that will receive at least one of the tabs of the locking spring.

A tool that has projecting ears that fit in the slots of the nut flange, is utilized to rotate the nut to facilitate installing and removing the nut from the threaded spindle end. The ears of the tool extend into the slots of the flange of the nut and prevent the tabs of the locking spring from entering the slots of the nut until the tool is removed. As the nut is tightened, the nut, spring and backup plate will become in close abutment. The tabs of the spring which are normally biased to enter into the slots of the flange of the nut are forced further into the notches of the back up plate by the cooperative action of the ears of the tool that are extended into the slots of the nut flange and by the face of the flange.

When the nut is torqued to the desire setting, the tool is removed allowing a tab of the spring in alignment with the slot of the nut to enter the slot to prevent rotation of the nut on the spindle. If a tab is not in alignment with a slot of the nut, the nut requires only a few degrees of rotation to align one of the tabs with one of the slots of the nut.

BRIEF DESCRIPTION OF THE DRAWINGS

FIG. 1 is an exploded view of a nut and locking device of the present invention along with an installing tool;

FIG. 2 is a view of the lock spring of FIG. 1 as viewed on view lines 2—2 of FIG. 1;

FIG. 4 is a view showing the relation of the nut and locking device and installation tool of FIG. 1 during installation or removal of the nut;

FIG. 5 is a view showing the relation of the nut and locking device after installation and with the tool removed.

DESCRIPTION OF THE PREFERRED EMBODIMENT

Figure 3:
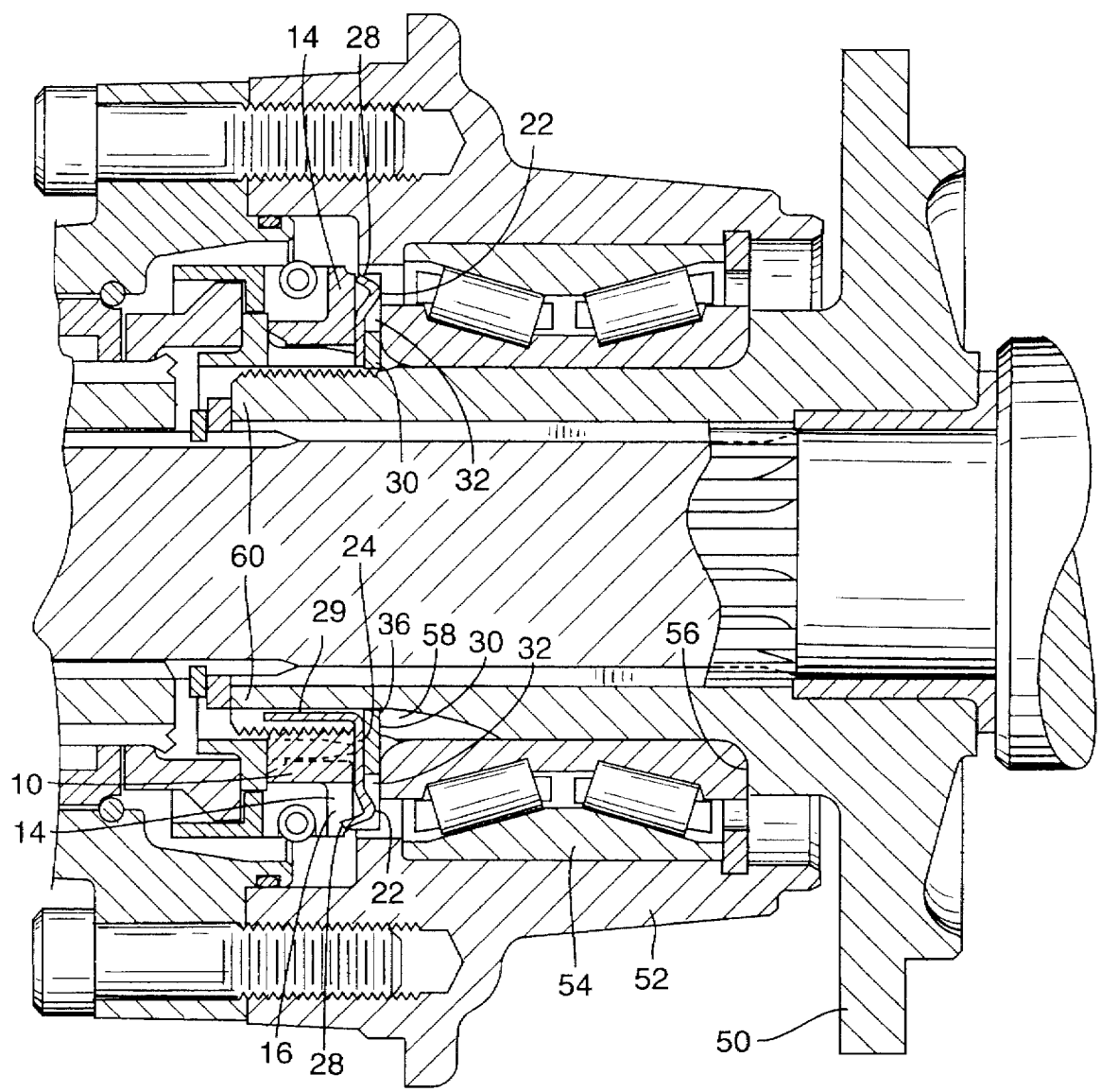
FIG. 3 is a sectional view of the nut and locking device of FIG. 1 installed on a spindle to secure a wheel hub to a wheel spindle of a vehicle.

Refer to FIG. 1 of the drawings which illustrates in exploded view a spindle nut 10 and locking device (anti-rotation spring 20 and back up plate 30) of the present invention along with a tool 40 for threadably installing the nut on a threaded portion of a spindle 50 (not shown in FIG. 1).

The nut 10 as shown in FIG. 1 has internal threads 12 that will mate with the external threads of the spindle 50 (shown in FIG. 3). The body of the nut 10 has a radially extending flange 14 that has multiple slots 16 formed around its periphery.

The anti-rotation spring 20 as shown in FIG. 1 is of a resilient spring like material and basically has a circular disk-like configuration. The spring 20 has multiple tabs 22 extending radially from the body portion (disk) 24. The tabs 22 are each configured and sized to fit in a slot 16 of the nut 10. As best seen in FIG. 2, the tabs 22 have a bend in their leg 26 so that the tabs 22 are at an angle to the plane of the body 24 of the spring 20. The upper end 28 of the tabs 22 are bent substantially normal to the bend in the leg 26. The upper end 28 projects beyond the plane of the body 24 on one side as indicated by 25 and the leg 26 projects beyond the plane of the body 24 on the opposite side as indicated by 27. A leg 29 (FIG. 1) projects radially inward from the body 24 of the spring 20 and is arranged to engage a keyway, flat or the like (slot) in a spindle or the like. As shown the leg 29 is bent to extend axially relative to the body 24. The axially extended portion is primarily to assist assembly (e.g., avoid mounting the spring backwards). It can be eliminated nut leaving the radially projected portion for engaging the keyway.

The back up plate 30 is also disk like in its configuration and has notches 32 in its body 34 that will mate with the tabs 22 of the spring 20. A projection 36 extends radially inward from the body 34 of the backup plate 30 and is arranged to engage a keyway (slot) of a spindle or the like. The projection 36 of the back up plate 30 and the leg 29 of the spring 20 align the tabs 22 of the spring 20 with the notches 32 of the back up plate 30 when the spring 20 and the back up plate are installed on a spindle or the like.

A tool 40 is utilized to rotate the nut 10 to facilitate the installation and removal of the nut from a spindle or the like. The tool 40 has a cup 42 shaped much like a conventional socket wrench. The tool 40 has projecting ears 44 that extend from one end of the cup 42 as shown. The ears 44 are in a spaced relation and are arranged to engage the slots 16 of the nut 20 when the tool 40 is applied to rotate the nut. The ears 44 are of a length to extend into the slots 16 and to be flush with the face 18 of the flange 14 as best seen in FIG. 4. Lands 46 between adjacent ears 44 will come into engagement with the flange 14 to properly position the ears 44 in the slots 16. One end of the cup 42 is arranged to receive a driving tool. In this embodiment, the tool 40 has a hex shaped formation 48 extending from the base 47 and in addition the formation 48 has an internal square opening 49.

The spindle nut 10, the lock spring 20 and the back up plate 30 are installed on a spindle 50 to secure a wheel hub 52 as shown in FIG. 3. The hub 52 is rotatably mounted on the spindle 50 on bearings 54 with the bearings 54 engaging a shoulder 56 of the spindle 50. The nut 10 secures the installation of the hub 52 on the spindle 50. As shown, the back up plate 30 is first installed on the spindle 50 and is in engagement with the bearings 54. The projection 36 of the backup plate 30 fits in a longitudinal keyway (slot) 58 of the spindle 50. The backup spring 20 is installed next to the back up plate 30 with leg 29 fitting in the keyway 58. The backup plate 30 and the spring 20 are thus non-rotatable relative to the spindle 50 and are in alignment with the tabs 22 being received in the notches 32 of the back up plate 30.

FIG. 3 is an illustration of a wheel hub assembled on a spindle 50. As shown, the nut 10 has been threadably installed on the threaded end 60 of the spindle 50 and has been tightened to a desired torque value to establish a preload on the bearings 54. The view in the top half of FIG. 3 shows a tab 22 being forced further into a slot 32 of the backup plate 30 by the face 18 of the nut flange 14. The position of a tab 22 in alignment with a slot 16 of the nut 10 is illustrated in the lower half of FIG. 3 and in FIG. 5. Note in FIGS. 3 and 5 that the tab 22 engages both the nut 10 and the backup plate 30. The notches 32 of the backup plate 30 in engagement with the tab 22 when the tab 22 is also in engagement with a slot 16 of the nut 10 prevents the tab 22 from twisting when a torque is applied to the nut 10.

The nut 10 as previously mentioned is threadably installed on the threaded end 60 of the spindle 50 by utilizing the tool 40. As shown in FIG. 4, the ears 44 of the tool 40 extend into the slots 16 of the nut 10 with the end 45 of the ears 44 flush with the face 18 of the flange 14. The ears 44 engage the slots 16 to provide a driving coupling between the nut 10 and the tool 40. As the nut 10 is engaged by the tool 40 (to either install or remove) the ears 44 will force any tab 22 of the spring 20 that is in a slot 16 out of the slot and further into a groove 32 of the back up plate 30. The tabs 22 that are not in alignment with a slot 16 are urged further into the grooves 32 of the back up plate 30 by the face 18 of the flange 14 of the nut 10. The ears 44, when the tool engages the nut 10, prevent the tabs 22 from engaging (entering) a slot 16 of the nut 10.

During installation the nut 10 is rotated by the tool 40 until the desired torque level has been reached. The tool is then retracted from the nut 10. The tabs 22, due to their resiliency are urged toward the flange 14 of the nut 10. If one of the tabs 22 is aligned with one of the slots 16 of the nut 10, the end 28 of tab 22 will enter a slot 16 of the nut to prevent rotation of the nut 10 as illustrated in FIG. 5. Should all of the tabs 22 be out of alignment with a slot 16, only a few degrees of rotation of the nut will align one of the tabs 22 with one of the slots 16. In this embodiment, there are nine tabs 22 on the spring 20 and there are eight notches 16 in the flange 14 of the nut 10, therefore the nut 10 need only be rotated a few degrees to place a slot 16 of the nut 10 in alignment with a tab 22 of the spring 20.

Those skilled in the art will recognize that modifications and variations may be made without departing from the true spirit and scope of the invention. The invention is therefore not to be limited to the embodiments described and illustrated but is to be determined from the appended claims.

What is claimed is:

1. A spindle nut and locking device system for securing a nut in a rotative position on a spindle having a longitudinal slot in a threaded end, the system comprising:

a disk-shaped spring, tabs on the periphery of the spring, and a leg extending radially inward from the spring, wherein the spring is mountable on the spindle with the leg fitting in the longitudinal slot of the spindle;

a nut having internal threads, wherein the nut is threadably mountable on the threaded end of the spindle and engageable with the spring, slots formed in the periphery of the nut, the slots configured and arranged to receive the tabs of the spring;

a tool having ears, the slots of the nut engageable by the ears of the tool to rotatably threadably install the nut on the spindle and to prevent entry of the tabs of the spring into the slots of the nut until removal of the tool; and a back up plate, the plate having a projection extending radially inward, notches formed on the periphery of the plate, the notches arranged to receive the tabs of the spring, and wherein the plate is mountable on the spindle with the projection fitting in the longitudinal slot of the spindle and with the plate adjacent the spring with the spring being positioned between the plate and the nut.

2. The system according to claim 1 wherein: the tabs on the spring and the slots in the nut are unequal in number.

3. The system as defined in claim 1 wherein the tool further comprises:

a cup-shaped body member with the ears protruding from an edge surface of the body member, the ears equal in number to the slots of the nut and arranged to project into the slots and prevent entry of the tabs; and lands provided on the edge surface of the body member to establish the projection of the ears to be flush with the sides of the spring so as to insure uninterrupted sliding of the tabs across the slots.

4. A spindle nut and locking device for securing the nut on a spindle having a threaded end with a longitudinal slot, comprising:

a disk-shaped spring, the spring having peripheral tabs and a leg extending radially inward, wherein the spring is mountable on the spindle with the leg fitting in the longitudinal slot of the spindle;

a nut having internal threads, wherein the nut is threadably mountable on the threaded end of the spindle and engageable with the spring, the nut having integral peripheral slots configured and arranged to receive the tabs of the spring; and a back up plate, the plate having a projection extending radially inward, notches formed on the periphery of the plate, the notches arranged to receive the tabs of the spring, the plate mountable on the spindle with the projection fitting in the longitudinal slot of the spindle and with the plate adjacent the spring with the spring positioned between the plate and the nut.

\* \* \* \* \*